United States Patent [19]
Couch, Jr. et al.

[11] Patent Number: 5,558,786
[45] Date of Patent: Sep. 24, 1996

[54] PROCESS FOR HIGH QUALITY PLASMA ARC AND LASER CUTTING OF STAINLESS STEEL AND ALUMINUM

[75] Inventors: Richard W. Couch, Jr., Hanover, N.H.; Nicholas A. Sanders, Norwich, Vt.; Zhipeng Lu; Lifeng Luo, both of Lebanon, N.H.; Staffan C. O. Stenfelt, Lammhult, Sweden

[73] Assignee: Hypertherm, Inc., Hanover, N.H.

[21] Appl. No.: 319,470

[22] Filed: Oct. 6, 1994

Related U.S. Application Data

[63] Continuation of Ser. No. 24,416, Mar. 1, 1993, Pat. No. 5,380,976, which is a continuation-in-part of Ser. No. 989,183, Dec. 11, 1992, Pat. No. 5,414,236.

[51] Int. Cl.$^6$ ............................................... B23K 10/00
[52] U.S. Cl. ........................ 219/121.44; 219/121.59; 219/121.55; 219/121.84; 219/121.64
[58] Field of Search ..................... 219/121.39, 121.44, 219/121.55, 121.54, 121.48, 121.63, 121.64, 121.84, 121.67, 121.72, 75, 121.59

[56] References Cited

U.S. PATENT DOCUMENTS

| | | | |
|---|---|---|---|
| 3,567,898 | 3/1971 | Fein | 219/121.44 |
| 3,575,568 | 4/1971 | Tateno | 219/75 |
| 3,619,549 | 6/1971 | Hogan | 219/75 |
| 4,174,477 | 11/1979 | Essers et al. | 219/76.16 |
| 4,410,788 | 10/1983 | Summers et al. | 219/130.1 |
| 4,885,455 | 12/1989 | Schultz et al. | 219/121.46 |
| 4,918,283 | 4/1990 | Yamade et al. | 219/121.46 |
| 4,977,305 | 12/1990 | Severance, Jr. . | |
| 5,380,976 | 1/1995 | Couch, Jr. | 219/121.44 |

FOREIGN PATENT DOCUMENTS

| | | |
|---|---|---|
| 0129603 | 6/1984 | European Pat. Off. . |
| 3-118981 | 5/1991 | Japan . |

*Primary Examiner*—Mark H. Paschall
*Attorney, Agent, or Firm*—Testa, Hurwitz & Thibeault

[57] ABSTRACT

Plasma arc or laser cutting uses a mix of reactive and reducing gas flows to cut sheets of stainless steel, aluminum and other non-ferrous metals. The reducing gas flow to the cut varies as a percentage of the total gas flow to maintain a reducing atmosphere down through the cut, but to leave a predominantly oxidizing atmosphere at the intersection of the cut and the bottom surface of the sheet being cut. In plasma arc cutting these flows can also be characterized as either a plasma gas flow, one that forms the arc, or a shield gas flow that surrounds the arc. The reactive gas is preferably a flow of air, oxygen, nitrogen, carbon dioxide or a combination of these gases. The reducing gas is preferably hydrogen, hydrogen 35, methane, or a mixture of these gases. For aluminum, the reactive gas is preferably air or nitrogen and the reducing gas is preferably methane or a mixture of methane and air. In laser cutting the reducing gases such as methane can be used by mixing them with reactive assist gases.

17 Claims, 2 Drawing Sheets

5,558,786

PROCESS FOR HIGH QUALITY PLASMA ARC AND LASER CUTTING OF STAINLESS STEEL AND ALUMINUM

This application is a continuation of U.S. patent application Ser. No. 08/026,416, filed Mar. 1, 1993, now U.S. Pat. No. 5,380,976 which is application is a continuation-in-part of U.S. patent application Ser. No. 07/989,183 filed Dec. 11, 1992 now U.S. Pat. No. 5,414,236.

BACKGROUND OF THE INVENTION

This invention relates in general to plasma arc and laser cutting of sheet metals. More specifically, it relates to a mixture of type and proportion of gases forming and/or shielding the arc or laser beam that yield very clean, shiny, and dross-free cuts in stainless steel, aluminum and other non-ferrous metals.

Plasma arc cutting of sheet metals is now used widely. However, heretofore for stainless steel and non-ferrous metals such as aluminum it has not been possible to produce a clean cut, one where there is a shiny kerf that is free of oxides or nitrides of the metal being cut, which is also free of bottom dross.

The plasma arc is a jet of an ionized gas. While many gases can be used to form the arc, the gas selected is usually specific to the metal being cut. For example, to cut stainless steel, it is most common to use air, nitrogen, or a mixture of argon and hydrogen.

Nitrogen and air leave no bottom dross, but the cut quality is poor. The sides of the kerf have oxide or nitride inclusions and they undergo a change in metallurgical structure. In order to weld at this cut, or to obtain an acceptable appearance, it is necessary to grind or wire-brush the cut sides.

It is also known that using argon-hydrogen as the plasma gas to cut stainless. While these cuts are metallurgically "sheen", that is, shiny and clean, but at least for cuts in thin sheets, argon-hydrogen leaves a bottom dross that is unusually difficult to remove. Sheeny, dross-free cuts are possible with argon-hydrogen for sheets with a thickness in excess of about 0.5 inch (12.7 mm) using a 200 ampere torch and in excess of about 0.25 inch (6.4 mm) using a 100 ampere torch. No plasma cutting technique has been found that produces sheeny kerfs without dross when cutting aluminum, regardless of its thickness.

It is also well known to use shield gases, typically a secondary gas flow through the torch that is independent of the plasma gas flow and surrounds the arc, whether by impinging on it as it exits the torch or downstream, near or at the workpiece. Shield gases can serve a variety of functions, such as cooling, isolation of the cutting action in the kerf from the atmosphere, and the protection of the torch against upwardly splatterd molten metal. Plasma and shield gases are used, for example, in the plasma arc cutting torches sold by Hypertherm, Inc. of Hanover, New Hampshire under its trade designations MAX®200, MAX®100, MAX®100D and HD1070. The numbers 200, 100 and 70 denote current ratings for these torches. None of the known torches using shield gases have demonstrated any ability to improve on the cut quality of known nitrogen, air and argon-hydrogen cutting when used on stainless steel and non-ferrous metals such as aluminum.

Laser cutting has suffered from similar cut quality problems when used to cut stainless steel and non-ferrous metals. The oxygen and nitrogen assist gases form oxides and nitrides in the kerf. Good cut quality can be obtained using helium, argon or other non-reactive gases, but cutting with these gases is very slow, the gas must be at high pressures, and preferably it is highly pure, and therefore more costly.

It is therefore a principal object of the present invention to provide a plasma arc and or laser cutting process that can cut stainless steel, aluminum and other non-ferrous metals at commercially acceptable speeds with an extremely high cut quality.

A further principal object is to provide a cutting process that is adaptable to different metals and different torches, including high density plasma arc torches, and plasma torches using only a plasma gas or ones using plasma and shield gases.

Another object is to provide a cutting process with the foregoing advantages even when used on thin sheets of the metal.

Still another object is to provide all of the foregoing advantages using known equipment and operating materials and at a favorable cost.

SUMMARY OF THE INVENTION

At least one gas flow to a cutting torch constitutes or contains as a component of a mixed flow of gases a reducing gas. The gas flows also include a gas that reacts with the metal. The flow ratio of the reducing gas flow to the total gas flow to the cut, whether introduced as a plasma and/or shield gas to a plasma arc torch, or as an assist gas in laser cutting, is controlled so that the reducing gas is completely dissipated in the kerf. As a result, the reducing gas has a negligibly small concentration at region defined by the kerf and the bottom surface of metal workpiece. Stated conversely, the atmosphere at the bottom surface is predominantly oxidizing. The gas selection and control of the reducing gas ratio can be defined functionally as ones which provide a reducing atmosphere that extends through the kerf, from the top to the bottom surfaces of the workpiece, but which also produce an oxidizing atmosphere at the bottom surface. The ratio which yields this result varies empirically with the type of metal, the type and power of the torch, the type of gases being used, and the thickness of the workpiece. For a given application, the ratio varies with the thickness. This process produces high quality cuts in stainless steel, aluminum, and other non-ferrous metals. The cuts are sheeny and free of bottom dross.

In plasma arc cutting, while this mixture of gases can be formed solely in a plasma gas, the gases are preferably introduced as plasma and shield gases. The reactive and reducing gases can appear, solely or in mixture, as either one of, or both of, these gas flows.

To cut stainless steel with a high definition plasma arc torch at low power, the plasma gas is preferably air or nitrogen flowing typically at 40 scfh (standard cubic feet per hour) for low to medium power applications. With nitrogen as the plasma gas, the shield gas can be methane or methane and air. The ratio of the methane flow rate to air flow rate ranges from about 5% to 25% depending on the thickness of the workpiece. A typical shield gas flow rate is in the range of 20 to 60 scfh, depending on the thickness. For high definition plasma arc cutting of aluminum, the plasma gas is again air or nitrogen with methane as a shield gas. With a nitrogen plasma gas, the methane can be mixed with air, again in varying ratios to accommodate different thicknesses.

Plasma gases for a standard plasma arc torch can include hydrogen, hydrogen 35 mixed with nitrogen, and a mixture of hydrogen and nitrogen, and air. Shield gases include nitrogen and carbon dioxide. Nitrogen is the preferred shield gas with either the hydrogen 35 and nitrogen mixture or the hydrogen-nitrogen mixture as the plasma gas.

For stainless and aluminum plasma arc cutting, the reactive gas is preferably nitrogen, air, other mixtures of oxygen and nitrogen other than air. Reducing gases can include hydrogen, hydrogen 35, methane, and other flammable hydrocarbon gases known to combine with oxygen. The reducing gas preferably constitutes between 2% and 50% of the total gas flow—plasma gas and shield gas, if any—depending on the thickness of the workpiece, other parameters being constant.

For laser cutting, assist gas flows using hydrogen or a hydrogen-bearing gas such as methane as the reducing gas produce the improved cut quality of this invention. The assist gas flow rate, or where the assist gas is a mixture of gases, the ratio of the reducing gas to total assist gas flow, is varied to produce a predominantly reducing atmosphere within the kerf and a predominately oxidizing atmosphere at the bottom surface. As with plasma arc cutting, the ratio of reducing gas flow the total gas flow is between 2% and 50%, again depending on factors such as the type and thickness of the metal forming the workpiece.

These and other features and objects of the present invention will be more clearly understood from the following detailed description which should be read in light of the accompanying drawings.

DETAILED DESCRIPTION OF THE PREFERRED EMBODIMENTS

Figure 1:
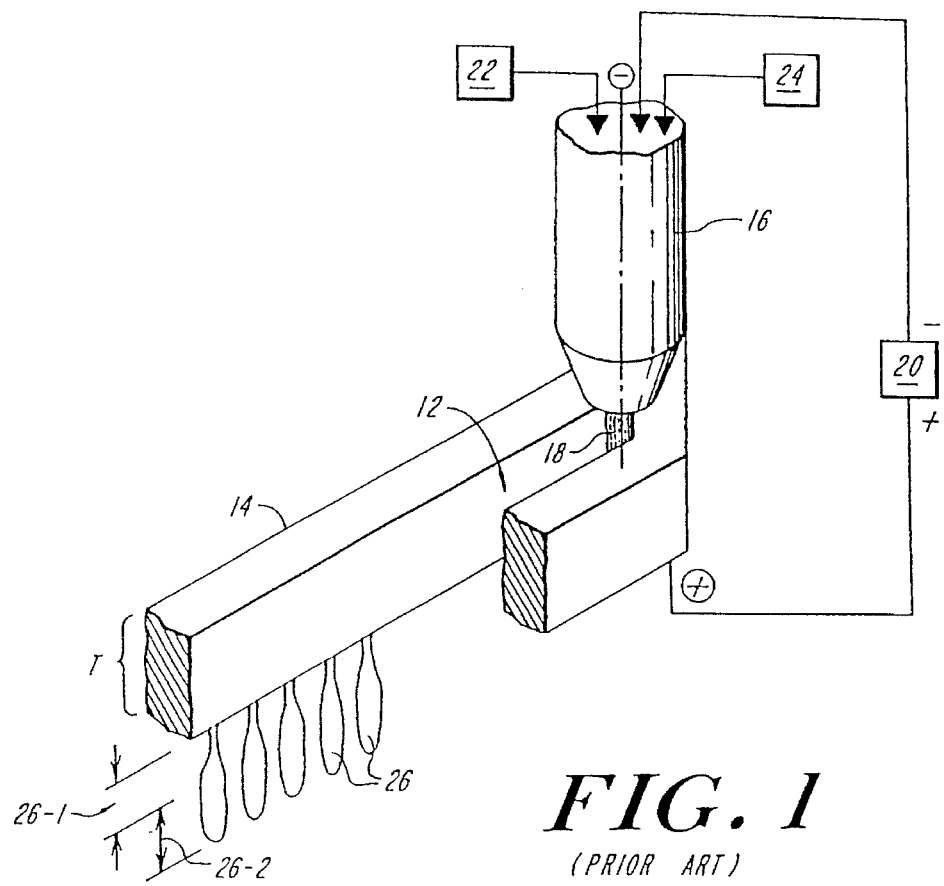
FIG. 1 is a view in perspective of a prior art plasma arc, argon-hydrogen cutting of a sheet of stainless steel.

FIG. 1 shows prior art plasma arc cutting of a kerf 12 in a workpiece 14, in this case a stainless steel plate. A plasma arc cutting torch 16 of known construction produces an arc 18 that transfers from the torch to the workpiece to produce the kerf. The arc 18 is a jet of ionized gas that conducts current to the workpiece. A DC power supply 20 is connected in series with the torch and the workpiece. The plasma gas is an argon-hydrogen mixture, typically 35% hydrogen and 65% argon by volume, commercially sold as hydrogen 35. A regulated, adjustable rate supply 22 of the plasma gas is illustrated schematically. Depending on the torch and application, the cutting torch can also receive a flow of a shield gas from a separate regulated, adjustable flow rate supply 24. Typical torches 16 include the standard cutting torches sold by Hypertherm, Inc. of Hanover, N.H. under its trade designations MAX®100, MAX®100D, and MAX®200 and its high density 70 ampere torch sold under the trade designations "HyDefinition" and "HD1070".

This particular prior art system can cut stainless steel sheets while producing a clean, shiny kerf. However, as noted above, it also produces a very difficult bottom dross 26. The dross forms in two regions. An upper region 26-1 near the kerf retains a metallic look. In a lower region 26-2, the dross is dark from the formation of oxides.

Figure 2:
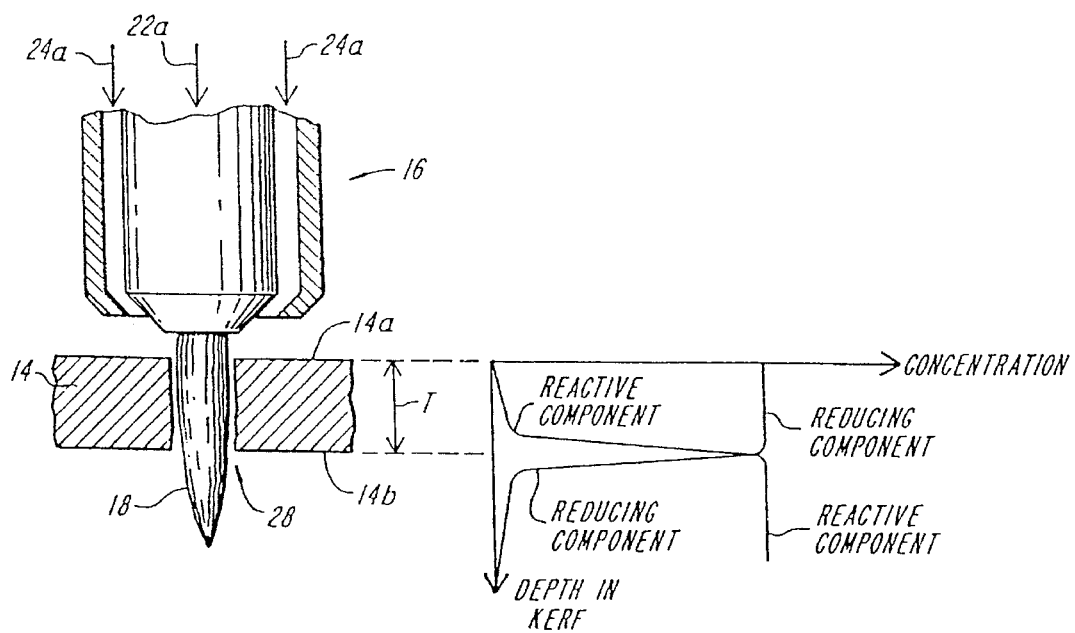
FIG. 2 is a simplified view in vertical section of a gas shield plasma arc cutting torch operating according to the process of the present invention together with an associated graph showing the concentrations of oxygen and hydrogen in the kerf as a function of the depth of the kerf.

FIG. 2 shows a cutting system according to the present invention. As in FIG. 1, the torch shown is a known plasma arc torch such as the MAX® and HyDefinition™ products identified above using a plasma gas flow 22a and a shield gas flow 24a. The power of the torch, as measured by its operating current, typically range from low power units of 15 to 50 amperes, to high power units of 400 to 500 amperes. For high definition torches, relatively small currents, e.g. 70 amperes are typical, but at a very high current density. Typical standard torch currents for the most common thicknesses are 100 to 200 amperes.

Figure 4:
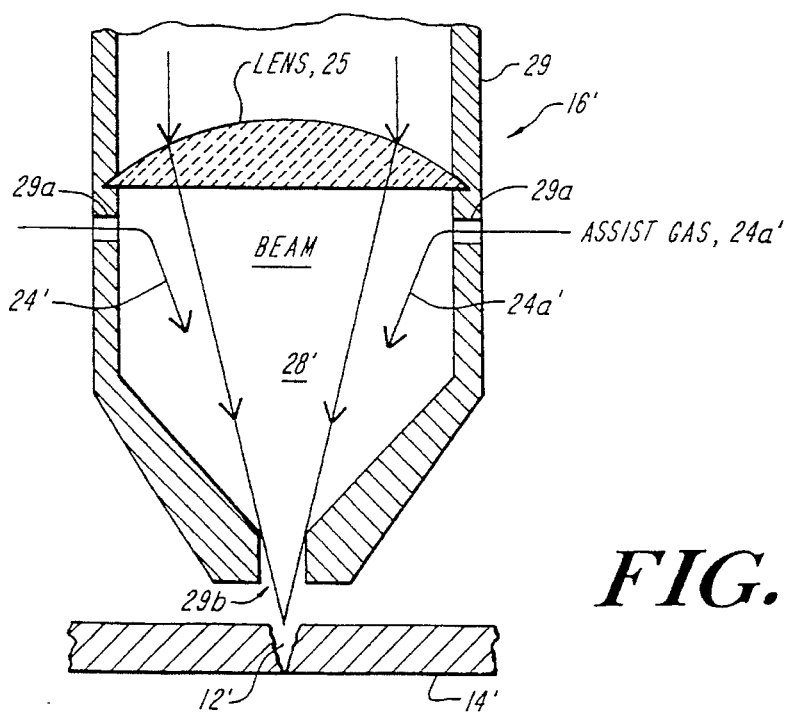
FIG. 4 is a simplified view in vertical section of a laser cutting device with an assist gas according to the present invention.

The torch can also be a standard laser cutter 16' as shown in FIG. 4 (like parts being identified with the same number, but primed in the laser embodiment). The laser beam 28' heats the workpiece 14' at the kerf 12'. It also produces a chemical reaction between a reactive gas in the assist flow 24a' and the metal forming a workpiece 14'. The reactive gas is typically oxygen or nitrogen. As is well known, the presence of an active assist gas speeds the cutting action of the laser. As will be discussed in greater detail below, according to the present invention the assist flow 24a' also includes a reducing gas. The light beam 28' is coherent, and has a high energy. A lens 25 focuses the beam 28' on or within the workpiece 14'. The assist gas 24a' enters a housing 29 through ports 29a below the lens. The assist gas flows out of the torch and into the kerf 12' in the workpiece 14' via an exit orifice 29b.

The workpiece 14 is a sheet. It can assume other forms, such as a firearm barrel, a bolt, or contoured structural member, but the cutting of sheets, including plates, is the most common application. An "upper" surface 14a of the sheet will then be understood to be the surface of the workpiece opposite the plasma torch. A bottom surface 14b faces away from the torch. For a sheet workpiece, the surfaces 4a and 14b are generally flat and parallel. The plate thickness T measured along a normal to the surfaces 14a,14b can vary from thin sheets, e.g. ⅛ inch (3.1 mm) to plates 2 inches (51 mm) thick.

A principal feature of the present invention is that the gas flow or flows from the torch to the kerf include as a constituent gas at least one gas of a type that reacts with the metal of the workpiece, and as another constituent gas a different type of gas that produces a reduction reaction, particularly one that will react chemically in a reduction reaction with reactive gases such as oxygen, or nitrogen, or a mixture of the two such as air. In plasma cutting, the reactive gas and the reducing gas can be mixed to form the plasma gas, or the shield gas, or they can be separated, one in the plasma gas flow and the other in the shield gas flow. In laser cutting, the reacting and reducing gases are mixed to form the single assist gas flow 24a.

Figure 3:
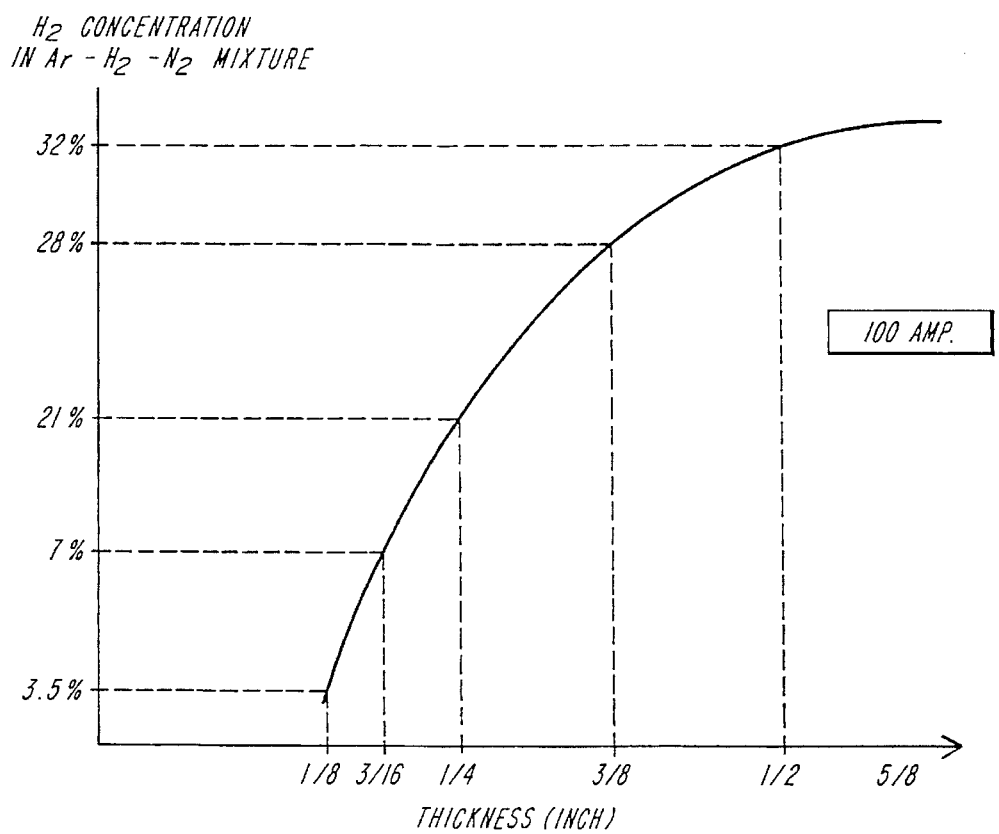
FIG. 3 is a graph of the percentage of reducing gas in a particular plasma gas flow according to the present invention as a function of the thickness of the workpiece.

A further principal feature of the present invention is that the amount of the reducing gas is carefully controlled as a portion of the total gas flow to the kerf—the sum of the plasma and shield gases where both are used. (Some ambient air or other gas flows may also enter the kerf, but they are usually present in insignificant amounts or are sufficiently removed from the cutting action as to be of little or no functional consequence.) The degree of control is conveniently expressed as the ratio of the flow rate of the reducing gas or gases to the total gas flow rate. This ratio varies with parameters such as the type of metal being cut, its thickness, the type and power of the torch, and the type or types of gas forming the plasma and shield gas flows. For a given application, the control ratio varies mainly as a function of the plate thickness. FIG. 3 shows a typical such relationship for the cutting of stainless steel plate with a MAX®100D brand plasma arc torch with a mixture of argon, hydrogen and nitrogen. The curve in FIG. 3 shows that for this example the ratio of hydrogen to the total gas flow should be about 3.5% for thin plates (⅛ inch), but about 32% for thick plates (½ inch). While the precise values will vary for each application, the general form of the curve shown in FIG. 3 defines this relationship. In general, the ratio of the reducing gas to total gas flow that will provide the results of the present invention for both plasma arc and laser applications falls in the range of about 2% to about 50%. The precise value for each application can be determined empirically by examining the cut quality for different ratios at a selected thickness, or at different thicknesses for a selected ratio.

This ratio control produces a predominantly reducing atmosphere within the kerf at the arc. This reflects a predominant concentration of the reducing gas extending from the upper surface 14a, substantially through the kerf, to a region 28 at the intersection of the kerf and the bottom surface 14b. At the region 28 there is then predominantly oxidizing atmosphere. This is reflected in FIG. 2 in the high concentration of reactive gas (e.g. oxygen) at the surface 14b and the negligible concentration of reducing gas (e.g. hydrogen). When properly controlled, it is believed that the amount of the hydrogen or other reducing gas present in the flow is used up in chemical reaction with the reactive gas in the kerf. This condition produces cuts in stainless steel and non-ferrous metals of a quality that heretofore never been obtained using plasma arc cutting, regardless of the thickness of the workpiece. This condition also allows laser cutting with a high cut quality at speeds heretofore unattainable, and without constraints on gas purity and pressure which have heretofore been associated with non-reactive assist gases such as helium and argon.

While the precise mechanism(s) that produce this result are not known with certainty, applicants are of the opinion that the predominantly reducing atmosphere in the kerf prevents an oxidizing reaction between the molten metal being cut and reactive gases present in the kerf. (The oxidizing reaction is the one which cuts the metal, e.g. the creation of oxides or nitrides of the metal being cut which are carried away by the plasma jet or the action of laser beams and associated gas flows on the material.) The reducing gas (or its ions or radicals formed in the plasma) is believed to react with the oxidizing gas (or its ions or radicals formed in the plasma) preferentially. In the region 28, the predominantly oxidizing atmosphere is believed to be essential to oxidize molten metal before it runs out of the bottom of the kerf to form a dross. This analysis provides a functional guide for the control over the reducing gas portion of the total gas flow. If there is too little reducing gas, the kerf will not be sheeny throughout. If there is too much reducing gas, a dross will form.

As an illustration of the process of the present invention, but not as a limitation, applicants give the following examples of this invention which have been successfully practiced using Hypertherm MAX®100D and HyDefinition HD1070™ plasma arc cutting systems on stainless steel and aluminum sheets having thicknesses that varied from ⅛ inch to ⅝ inch.

Using an HD1070™ system to cut stainless steel, the following combinations of plasma and shield gases were used successfully at typical flow rates of 40 scfh for the plasma gas and 20 to 60 scfh for the shield gas, with the variation in shield flow rate corresponding to the thickness of the workpiece generally as shown in FIG. 3.

TABLE I

| (High Density, Stainless) | |
|---|---|
| Plasma Gas | Shield Gas |
| $N_2$ | $CH_4$ (methane) |
| air | $CH_4$ |
| $N_2$ | $CH_4$ and air |
| air | $CH_4$ and air |

The ratio of methane to air varies from about 5:95 to 25:75 depending on the thickness of workpiece, the total shield gas flow rate being constant.

Using the HD1070™ system to cut aluminum, Table II gives successful plasma and shield gases at the flow rates given above with respect to Table I. The shield gas mix of air and methane is variable from almost 100% methane to almost no methane, depending again on the thickness of the aluminum sheet being cut.

TABLE II

| (Aluminum) | |
|---|---|
| Plasma Gas | Shield Gas |
| air | $CH_4$ |
| $N_2$ | $CH_4$ and air |

Table III gives suitable plasma and shield gases for cutting stainless steel with a MAX®100D plasma arc cutting system. Typical flow rates are those given above with respect to Table I.

TABLE III

| (Standard Arc, Stainless) | |
|---|---|
| Plasma Gas | Shield Gas |
| Hydrogen 35 and $N_2$ | $N_2$ |
| $H_2$ and $N_2$ | $N_2$ |
| Hydrogen 35 and $N_2$ | $CO_2$ |
| $H_2$ and $N_2$ | $CO_2$ |

The percentage of hydrogen 35 in the mixture varies from about 10% for thin sheets to about 90% for thick sheets. The percentage of $H_2$ in the second and fourth mixtures varies from about 3.5% for thin sheets to about 35% for thick sheets.

There has been described a process which produces high quality—sheeny and dross free—cuts in stainless steel and non-ferrous metals such as aluminum using plasma arc and laser cutting. The invention can produce these results on sheets or other configurations having any of a wide variety of thicknesses using high density plasma cutting systems, standard plasma cutting systems and standard laser systems. The invention is also compatible with plasma cutting systems operating over a wide range of power levels and with mechanical shields and gas flow shields against upwardly splattered molten metal.

While the invention has been described with respect to its preferred embodiments, it will be understood that various modifications and variations will occur to those skilled in the art from the foregoing detailed description and the accompanying drawings. For example, while the examples use mainly nitrogen and air as the reactive gases, other reactive gases including oxygen alone, oxygen-bearing gases, and oxygen-nitrogen mixes not in the proportion of air are contemplated. Similarly, other reducing gases, particularly hydrogen bearing gases, can be used. In particular methane is illustrative of a class of flammable gases that combine with oxygen in an exothermic reaction, although perhaps having a greater cost or producing undesirable byproducts. Hydrazane ($N_2H_4$) is one such hydrogen-bearing gas that can be used. These and other modifications and variations that occur to those skilled in the art are intended to fall within the scope of the appended claims.

What is claimed is:

1. A cutting process for producing a high quality kerf in stainless steel and non-ferrous workpieces using a laser cutting torch, the workpieces having an upper surface adjacent the torch and a bottom surface opposite the torch, the torch using a total gas flow to the kerf, the process comprising:

forming a portion of the total gas flow from a reducing gas, and adjusting the ratio of the reducing gas flow to the total gas flow prior to cutting to produce a predominantly reducing atmosphere through the kerf and predominately oxidizing atmosphere generally at the region defined by the bottom surface and the kerf, the adjusting including increasing the: proportion of the reducing gas introduced into the kerf in coordination with an increasing thickness of the workpiece.

2. The cutting process of claim 1 wherein the adjusting comprises mixing at least one gas that is reactive with the workpiece and at least one reducing gas.

3. The cutting process of claim 1 wherein the total gas flow includes the at least one gas that is reactive with the workpiece and the at least one reducing gas.

4. The cutting process of claim 1 wherein the mixing is a mixing of component gases of at least one the reactive gas and the reducing gas.

5. The cutting process of claim 1 further comprising limiting the ratio of the reducing gas flow to the total gas flow such that the concentration of reducing gas decreases to a negligible value at the region defined by the bottom surface and the kerf.

6. The cutting process of claim 1 further comprising adjusting the reducing gas flow to a value of between about 2% to about 50% of the total gas flow.

7. A process for cutting stainless steel and non-ferrous metal workpieces using a laser torch, wherein the torch uses a total gas flow that enters a kerf, the process comprising:

forming the total gas flow of at least one reactive gas and at least one reducing gas, and adjusting the relative proportions of the at least one reducing and at least one reactive gases prior to cutting, including changing the proportion of the reducing gas introduced into the kerf with respect to the total gas flow in coordination with an change in the thickness of the workpiece, so that the kerf is substantially sheeny and has substantially no bottom dross.

8. The cutting process of claim 7 wherein when the workpiece is stainless steel, the reactive gas is selected from the group consisting of oxygen, nitrogen, carbon dioxide and mixtures of these gases, including air, and the reducing gas is selected from the group consisting of hydrogen, hydrogen 35, methane, hydrazine and mixtures of these gases.

9. The process of claim 7 wherein when the workpiece is aluminum, the reactive gas is selected from the group consisting of nitrogen and air and the reducing gas is methane.

10. The process according to claim 7 wherein the adjusting includes changing the reducing gas flow to a value of between about 2% to about 50% of the total gas flow.

11. The process of claim 7 further comprising limiting the proportion of the reducing gas relative to the total gas flow such that the concentration of reducing gas decreases to a negligible value at the region defined by the bottom surface and the kerf.

12. A cutting process for producing a high quality kerf in stainless steel and non-ferrous workpieces using a cutting torch which cuts a kerf that extends to a bottom surface of the workpiece, wherein the torch uses a total gas flow from the torch to the kerf, comprising:

forming a portion of the total gas flow from a reducing gas, and adjusting the ratio of the reducing gas flow to the total gas flow based on thickness of the workpiece prior to cutting, to thereby produce a predominantly reducing atmosphere through the kerf and a predominantly oxidizing atmosphere generally at the region defined by the bottom surface and the kerf.

13. The cutting process of claim 12 wherein the torch is a laser cutting torch.

14. The cutting process of claim 12 wherein the adjusting includes changing the reducing gas flow to a value of between about 2% to about 50% of the total gas flow.

15. The cutting process of claim 12 further comprising adjusting the ratio of the reducing gas flow to the total gas flow such that the concentration of reducing gas decreases to a negligible value at the region defined by the bottom surface and the kerf.

16. The process according to claim 12 wherein when the workpiece is aluminum or an aluminum alloy, the reactive gas is selected from the group consisting of air and nitrogen and the reducing gas is selected from the group consisting of methane and a mixture of air and methane.

17. The process according to claim 12 wherein the reactive gas is selected from the group consisting of oxygen, nitrogen, carbon dioxide and mixtures of these gases, including air, and wherein the reducing gas is selected from the group consisting of hydrogen, hydrogen 35, methane, and mixtures of these gases.

* * * * *